(12) United States Patent
Schaeffer

(10) Patent No.: US 10,688,585 B2
(45) Date of Patent: Jun. 23, 2020

(54) LOW MANGANESE FUME WELDING PROCESS

(71) Applicant: Lincoln Global, Inc., City of Industry, CA (US)

(72) Inventor: J. Ben Schaeffer, Rocky River, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 528 days.

(21) Appl. No.: 14/697,178

(22) Filed: Apr. 27, 2015

(65) Prior Publication Data
US 2016/0311047 A1 Oct. 27, 2016

(51) Int. Cl.
| | | |
|---|---|---|
| B23K 9/10 | (2006.01) | |
| B23K 9/12 | (2006.01) | |
| B23K 26/21 | (2014.01) | |
| B23K 9/173 | (2006.01) | |
| B23K 37/00 | (2006.01) | |
| B23K 9/167 | (2006.01) | |
| B23K 15/00 | (2006.01) | |
| B23K 26/348 | (2014.01) | |
| B23K 26/70 | (2014.01) | |
| B23K 9/32 | (2006.01) | |

(52) U.S. Cl.
CPC .......... *B23K 9/1093* (2013.01); *B23K 9/121* (2013.01); *B23K 9/167* (2013.01); *B23K 9/1735* (2013.01); *B23K 9/32* (2013.01); *B23K 15/0046* (2013.01); *B23K 26/21* (2015.10); *B23K 26/348* (2015.10); *B23K 26/702* (2015.10); *B23K 37/006* (2013.01)

(58) Field of Classification Search
CPC ...... B23K 9/1093; B23K 26/348; B23K 9/32; B23K 37/006; B23K 15/0046; B23K 26/702; B23K 9/121; B23K 26/21; B23K 9/1735; B23K 9/167
USPC ............. 219/137 WM, 137.2, 146.1, 146.31, 219/146.32, 146.41, 146.52
See application file for complete search history.

(56) References Cited

U.S. PATENT DOCUMENTS

| | | | | |
|---|---|---|---|---|
| 3,483,354 A | * | 12/1969 | Saenger, Jr. ........... | B23K 9/167 219/137 PS |
| 7,743,967 B2 | * | 6/2010 | Frankel ................ | B23K 35/004 219/146.23 |
| 8,653,417 B2 | | 2/2014 | Peters | |
| 2011/0297658 A1 | | 12/2011 | Peters | |
| 2013/0026149 A1 | * | 1/2013 | Fahlstrom .............. | B23K 9/188 219/136 |
| 2013/0043219 A1 | * | 2/2013 | Peters ................ | B23K 35/0261 219/72 |
| 2013/0193115 A1 | * | 8/2013 | Berg ...................... | B23K 9/122 219/74 |
| 2013/0270244 A1 | * | 10/2013 | Barhorst ................ | B23K 9/167 219/137 R |
| 2013/0313240 A1 | * | 11/2013 | Amata .................... | B23K 35/36 219/137.2 |
| 2014/0083981 A1 | | 3/2014 | Amata et al. | |

(Continued)

*Primary Examiner* — Ibrahime A Abraham
*Assistant Examiner* — Biniam B Asmelash
(74) *Attorney, Agent, or Firm* — Calfee, Halter & Griswold LLP

(57) ABSTRACT

The amount of manganese in the weld fumes generated by an arc welding process can be reduced without reducing the concentration of manganese in the weld deposit ultimately obtained by supplying the manganese to the weld site by the hot wire welding electrode of a hot wire welding process.

10 Claims, 6 Drawing Sheets

(56) References Cited

U.S. PATENT DOCUMENTS

2014/0263193 A1    9/2014  Denney
2014/0263234 A1    9/2014  Peters
2014/0349136 A1*  11/2014  Barhorst ............ B23K 35/3053
                                              428/684
2015/0090698 A1*   4/2015  Siewert .................. B23K 9/124
                                              219/74

* cited by examiner

LOW MANGANESE FUME WELDING PROCESS

BACKGROUND

A common problem associated with arc welding is fume production. Because of the high temperatures involved, both the metallic and inorganic ingredients involved in the welding operation can vaporize into the atmosphere. Some of these ingredients such as manganese, chromium, nickel, cadmium and lead, for example, are deleterious to health. As a result, recent environmental regulations limit the amounts of these deleterious elements that can be present in the weld fumes produced by a typical welding operation.

One approach for reducing the amount of these deleterious elements in welding fumes is to reduce the concentration of these deleterious elements in the weld deposits that are ultimately produced. Normally, this is done by reducing the amount of these deleterious elements in the welding wires used to form these weld deposits. See, for example, U.S. 2013/0313240 and U.S. 2014/0083981 to Amata et al., which describe techniques for reducing the amount of manganese in welding fumes by using low-manganese welding wires to form low-manganese weld deposits.

Although such approaches may be effective in reducing the amount of deleterious elements in weld fumes, they are disadvantageous in that the weld deposits they produce are deficient in these very same elements.

SUMMARY

In accordance with this invention, it has been found that the amount of deleterious elements contained in weld fumes produced by different types of welding processes can be reduced substantially, without reducing the concentration of these same elements in the weld deposits ultimately produced, by using a hot wire welding approach to supply these deleterious elements to the weld pool.

Thus, this invention provides a method for reducing the amount of a deleterious element in the weld fumes generated by a non-oxyfuel welding processes without reducing the concentration of the deleterious element in the weld deposit produced by the non-oxyfuel welding processes, the non-oxyfuel welding process using at least one primary power source to supply intense heat for carrying out the welding process, this intense heat being sufficient to generate weld fumes by vaporizing at least some of the ingredients being supplied to the weld deposit, the method comprising carrying out the non-oxyfuel welding process by means of a hot wire welding approach in which some of the ingredients forming the weld deposit are supplied by a primary welding electrode which is subjected to the intense heat generated by the at least one primary power source while other of the ingredients forming the weld deposit are supplied by at least one hot wire welding electrode which is melted without being subjected to the intense heat generated by the at least one primary power source, and supplying greater than 50% of the deleterious element to the weld deposit by means of the at least one hot wire welding electrode, this percent being based on the total amount of this deleterious element which is supplied to the weld deposit by all filler wires.

BRIEF DESCRIPTION OF THE DRAWINGS

This invention may be better understood by reference to the following drawings wherein.

DETAILED DESCRIPTION

Hot Wire Welding

In accordance with this invention, a hot wire welding approach is used to supply deleterious elements to the weld pool of a non-oxyfuel welding process. As a result, the amount of these deleterious elements which vaporize during the welding process is reduced substantially which, in turn, results in much smaller amounts of these deleterious elements appearing in the weld fumes produced by the welding process.

In the context of this disclosure, a "non-oxyfuel" welding process will be understood to mean a welding process in which the high intensity power source used to supply the majority of the energy needed for welding is not derived from the combustion of a fuel. Thus, a non-oxyfuel welding process will be understood to exclude oxyacetylene welding, for example. Arc welding, laser-assisted welding and electron beam welding are good examples of non-oxyfuel welding processes in the context of this disclosure.

Also, in the context of this disclosure, a "hot wire" welding process will be understood to mean an non-oxyfuel welding process in which a high intensity (or "primary") power source such as an electric arc, laser beam or electron beam is used to generate intense heat for carrying out the welding process and further in which a secondary source of electrical power is used to resistance heat a welding filler wire (or "hot wire") which is fed to the weld site in such a way that it contacts the weld pool with little or no exposure to the intense heat generated by this high intensity power source.

Figure 1:
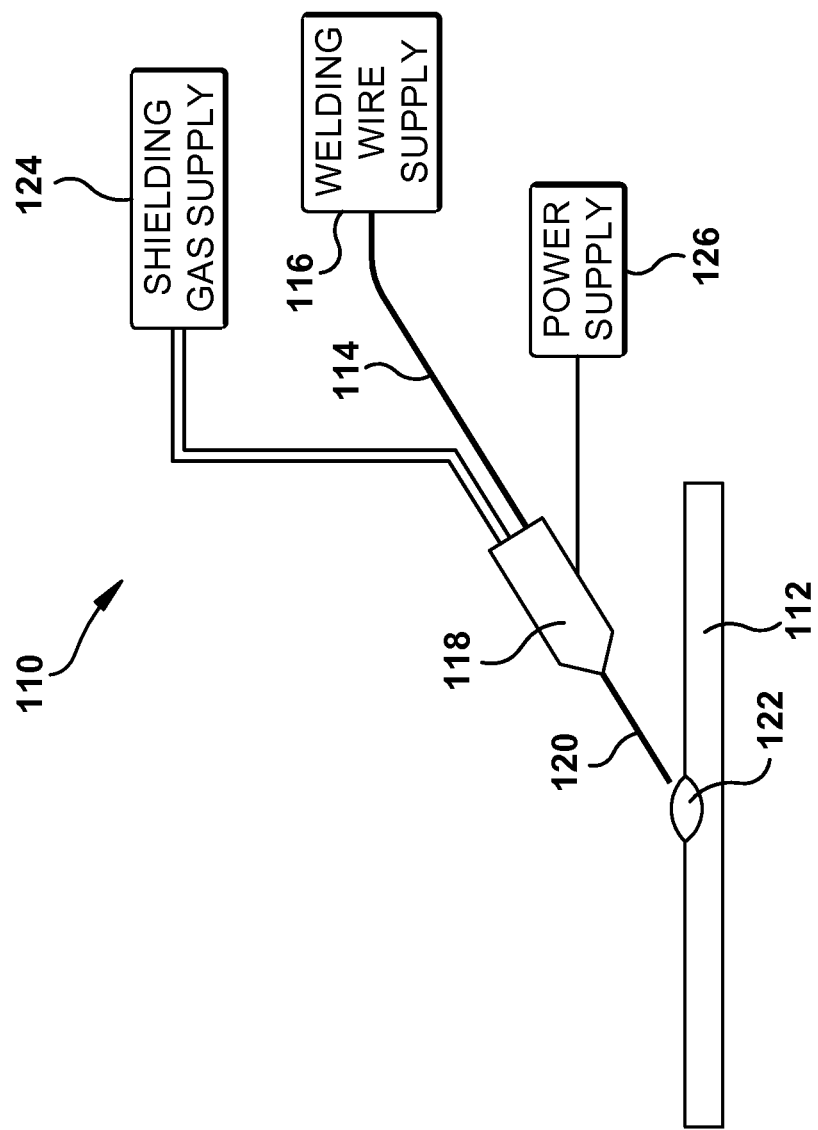
FIG. 1 is a schematic illustration of a conventional GMAW (gas metal arc welding process)

FIG. 1 illustrates a conventional gas metal arc welding (GMAW) process generally indicated at 110 in which a weld is produced in a workpiece 112. For this purpose welding wire 114 from welding wire supply 116 is fed through welding torch 118 in such a way that the distal end 120 of the welding wire approaches the site where welding occurs. A shielding gas supply 124 supplies a suitable shielding gas to torch 118, which is structured to direct this shielding gas to weld pool 122 for protecting this weld pool as it solidifies. A high intensity or "primary" power supply 126 supplies electrical power to welding torch 118 in such a way that an electric arc is created between distal end 120 of welding wire 114 and weld pool 122. The temperatures encountered in this arc are high enough to create a plasma, typically on the order of 3600° C. or more. Such high temperatures are necessary for completing the weld properly, as both the distal end of 120 of welding wire 114 as well as the portion of the workpiece being welded need to be melted for forming weld pool 122.

Because these temperatures are so high, a not-insignificant amount of the ingredients in welding wire 114 vaporize into the atmosphere as a natural result of the welding process. This can be of significant environmental concern when welding wire 114 includes certain elements which are known to have adverse health effects such as manganese, chromium, nickel, cadmium and lead, for example. Prior to this invention, the conventional way of dealing with this problem was to reduce the concentration of these deleterious elements in the weld deposits being produced by reducing the amount of these deleterious elements in the welding wires used to make these welds. In accordance with this invention, this problem is dealt with by using a hot wire welding approach.

Figure 2:
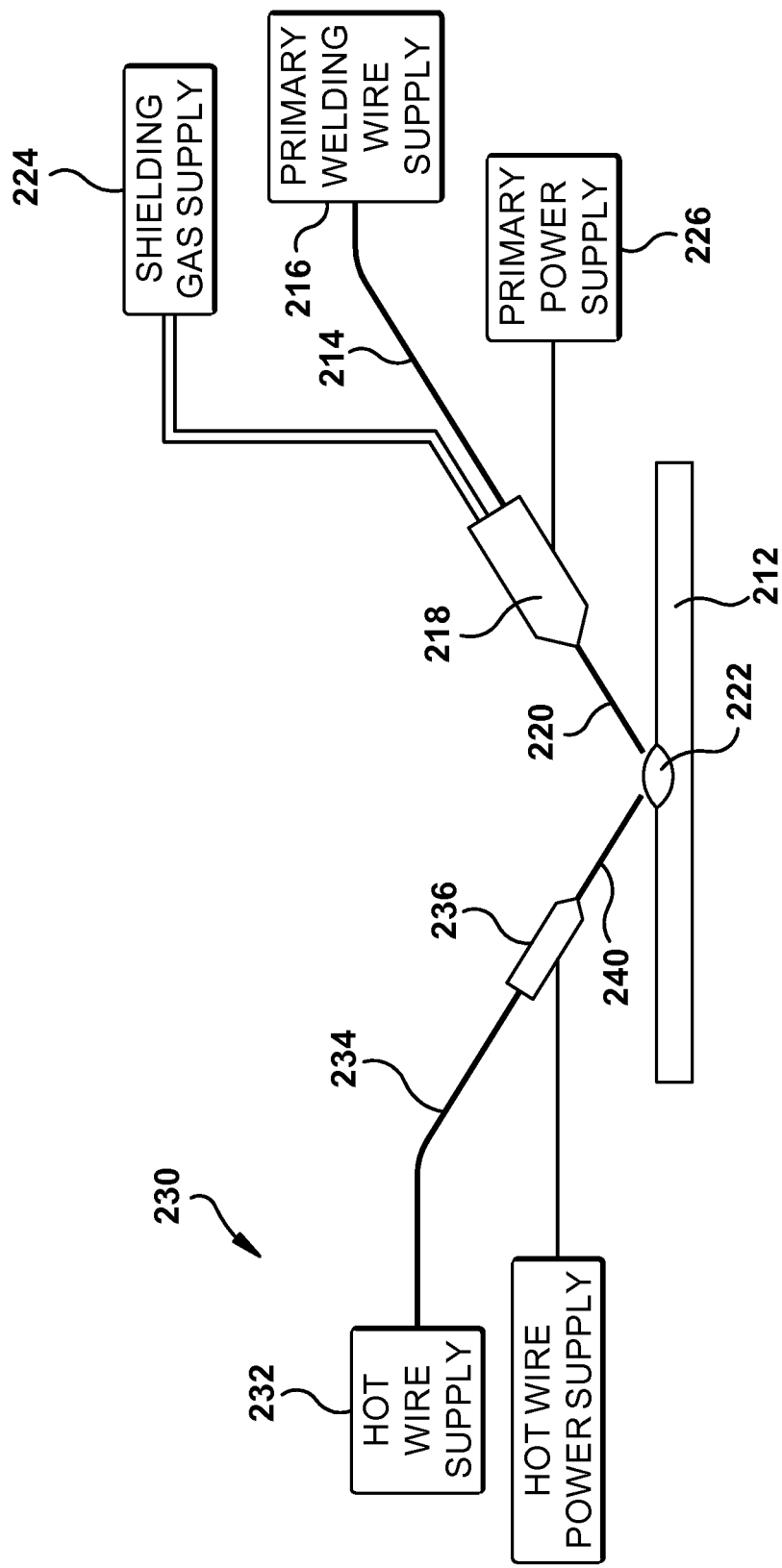
FIG. 2 is a schematic illustration similar to FIG. 1 illustrating a modified GMAW process adopting a hot wire welding approach in accordance with this invention.

FIG. 2 illustrates a first embodiment of this invention in which the non-oxyfuel welding process which adopts the hot wire welding approach of this invention is a GMAW process. As shown there, the GMAW hot wire welding process of this invention also uses essentially the same elements to carry out essentially the same welding process as described above in connection with FIG. 1. Thus, shielding gas supply 224, primary welding wire supply 216 and primary power supply 226 are used to supply a shielding gas, primary welding wire 214 and electrical power to welding torch 218 in such a way that a welding arc is created between the distal end 220 of primary welding wire 214 and weld pool 222. As in the case of the conventional GMAW process of FIG. 1, enough electrical power is supplied by primary power supply 226 to form an electric arc between the distal end 220 of primary welding wire 214 and weld pool 222, thereby melting this distal end as well as the portion of the workpiece 212 being welded.

In accordance with this invention, a hot wire assembly generally indicated at 230 is provided for separately supplying selected deleterious elements to weld pool 222, i.e., separate and apart from welding wire 214. For this purpose, hot wire assembly 230 includes hot wire supply 232 for supplying hot wire 234 to hot wire torch 236 and a hot wire power supply 238 for supplying electrical power to hot wire torch 236. This hot wire torch is similar to welding torch 118 used in the conventional GMAW process of FIG. 1 in the sense that it also is constructed and operated to advance distal end 240 of hot wire 234 towards weld pool 222.

However, hot wire torch 236 is operated in a somewhat different manner than welding torch 118 in that hot wire torch 236 is operated so that distal end 240 of hot wire 234 desirably just touches weld pool 222 at a location which is not within the electrical arc created between distal end 220 of primary welding wire 214 and workpiece 212. This can be done, for example, by feeding distal end 220 to workpiece 212 just in front of this electrical arc as it moves relative to the workpiece in carrying out the welding process. See, for example, commonly assigned U.S. Pat. No. 8,653,417 to Peters. In addition, hot wire power supply 238 is operated in such a way that the amount of electrical power supplied to hot wire torch 236 is desirably just enough to raise the temperature of the distal end 240 of this hot wire to at or near its melting temperature by resistance heating.

Because of these features, the distal end 240 of hot wire 234 does not melt until it touches, or essentially touches, weld pool 222. As a result, essentially all of this distal end 240 amalgamates into weld pool 222. It does not vaporize into the atmosphere, because it has not been exposed to the high temperatures inside the welding arc created between distal end 220 of primary welding wire 214 and weld pool 222. The overall result is that only a very small portion, if any, of the ingredients forming hot wire 234 vaporize into the weld fumes generated by this welding process.

In accordance with this invention, this feature of hot wire welding is taken advantage by using hot wire 234 to preferentially supply the deleterious elements to the weld deposit. Because these elements are not exposed to the high temperatures of the welding arc, they do not vaporize into the atmosphere and hence do not escape into the weld fumes ultimately produced. Rather, they remain on the workpiece where they amalgamate into the weld pool and hence the weld deposit ultimately formed. It will therefore be appreciated that, by segregating these deleterious elements into hot wire 234, it is possible to produce weld deposits have a desired high concentration of these deleterious elements while simultaneously minimizing the amount of these deleterious elements in the weld fumes ultimately produced.

Incidentally, in the particular embodiment shown in FIG. 2, hot wire torch 236 differs from welding torch 118 in that hot wire torch 236 also is not adapted to direct a shielding gas to weld pool 222. However, this feature, i.e., directing a shielding gas to weld pool 222 by means of hot wire torch 236, is optional and can be included in the inventive process of FIG. 2, if desired.

Figure 3:
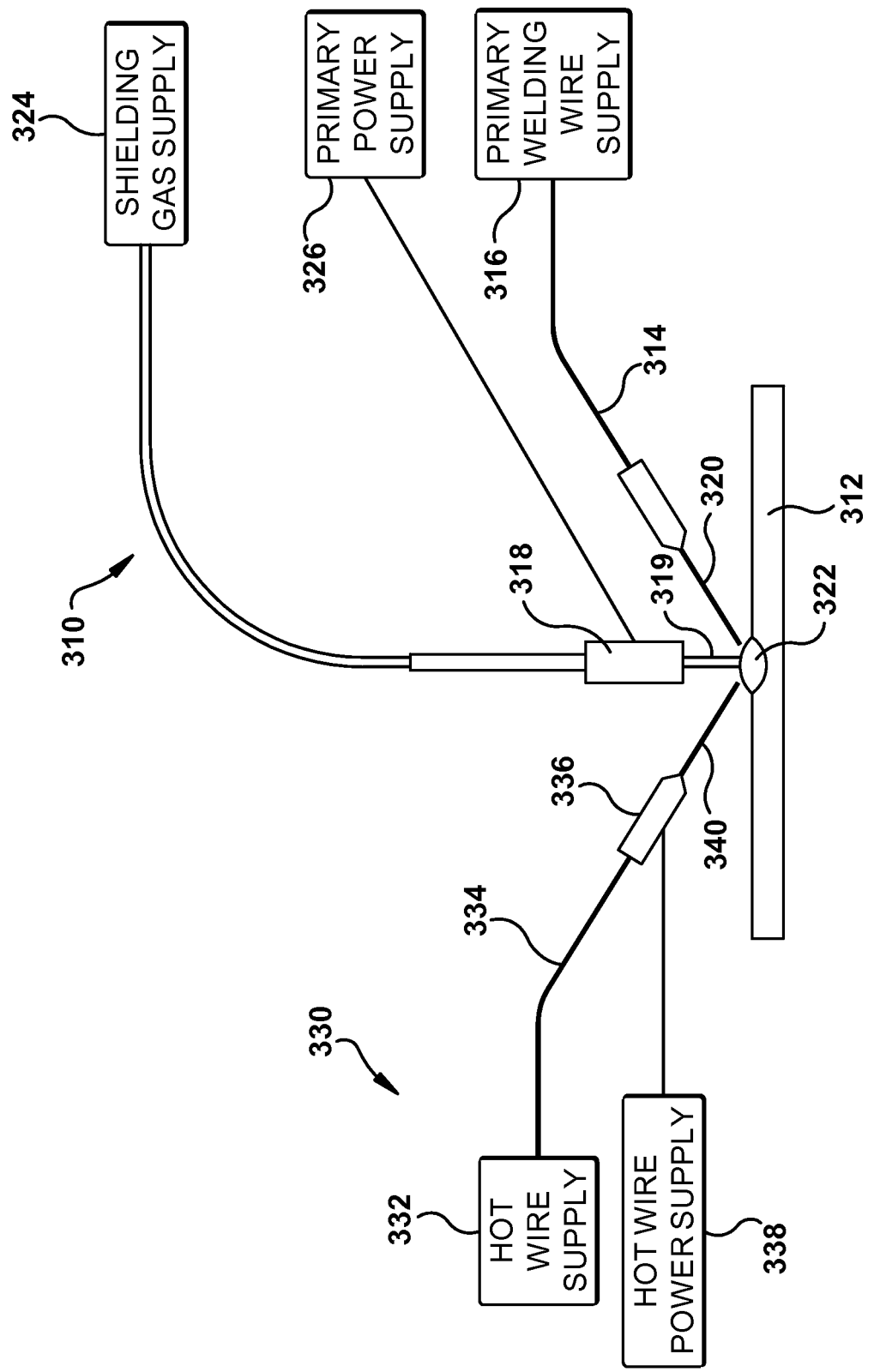
FIG. 3 is a schematic illustration similar to FIGS. 1 and 2 illustrating a modified TIG (tungsten inert gas) process adopting a hot wire welding approach in accordance with this invention.

FIG. 3 illustrates another embodiment of this invention in which the non-oxyfuel welding process which adopts the hot wire welding approach of this invention is a tungsten inert gas (TIG) welding process. As shown in this figure, a conventional TIG welding assembly generally indicated at 310 is used to form a weld in a workpiece 312. For this purpose, primary welding wire 314 is supplied to weld pool 322 from primary welding wire supply 316. In some embodiments, welding wire 314 can be a hand held stick filler wire, in which case the welder holding this stick filler wire can be considered to be welding supply 316. In addition, primary power supply 326 supplies electrical power to welding torch 318 in such a way that a welding arc is created between non-consumable tungsten electrode 319 held in welding torch 318 and weld pool 322. As in the case of a conventional TIG welding process, enough electrical power is supplied by primary power supply 326 to form weld pool 322 by melting both the distal end 320 of primary welding wire 314 as well as the portion of the workpiece being welded. As further shown in this figure, an inert shielding gas from shielding gas supply 324 is optionally supplied to welding torch 318 for protecting weld pool 322 as it solidifies.

In accordance with this invention, a hot wire assembly generally indicated at 330 is provided for separately supplying selected deleterious elements to weld pool 322, i.e., separate and apart from primary welding wire 314. This hot wire assembly has essentially the same structure and operates in essentially the same way as hot wire assembly 230 shown above in connection with FIG. 2. Thus, hot wire assembly 330 includes hot wire supply 332 for supplying hot wire 334 to hot wire torch 336 and a hot wire power supply 338 for supplying electrical power to hot wire torch 336. As in the case of hot wire assembly 230 of FIG. 2, hot wire torch 336 is also operated so that distal end 340 of hot wire 334 desirably just touches weld pool 322 at a location which is not within the electrical arc created between non-consumable tungsten electrode 319 and workpiece 312, while hot wire power supply 338 is operated so that the temperature of the distal end 340 of this hot wire is raised only to at or near its melting point by resistance heating.

As a result, little if any of distal end 340 of hot wire 334 vaporizes into the atmosphere, since it has been shielded essentially completely from the high temperatures of the welding arc created between non-consumable tungsten electrode 319 and weld pool 322. The overall result is that only a very small portion, if any, of the ingredients forming hot wire 334 vaporize into the weld fumes generated by this welding process. As a result, like the inventive welding process of FIG. 2, this feature can be taken advantage here to minimize the amounts of deleterious elements that escape into the weld fumes created by this arc welding process, while simultaneously maintaining a desirably high concentration of these deleterious elements in the weld deposit ultimately made, by preferentially segregating these deleterious elements into hot wire 334.

In this connection, it is already known to adopt a hot wire welding approach when using a TIG welding system as the high intensity power supply. This conventional TIG/hot wire welding process is similar to the inventive welding process described above in connection with FIG. 3, except that primary welding wire 314 is not used.

This conventional TIG/hot wire welding process also has the advantage of minimizing the concentration of deleterious metals in the weld fumes, because all of the deleterious metals supplied to the weld pool are supplied by the hot wire and hence are largely prevented from vaporizing into the weld fumes in the same way as the inventive process of FIG. 3. However, excessive heating of the hot wire used in this conventional TIG/hot wire welding process must be avoided in order to prevent vaporization of its ingredients. As a result, the speed at which this welding process can be carried out is inherently limited.

In this regard, it is well understood in the welding industry that most of the weld deposit formed in a workpiece by non-autogenous welding derives from the consumable welding electrode or electrodes used in the process. This means that in the conventional TIG/hot wire welding process described above, the maximum speed at which this process can be carried out is limited by the maximum rate at which the hot wire used in the process will melt without vaporizing. This maximum speed cannot be increased by increasing the heat energy supplied to the non-consumable tungsten electrode of the process, because an arc would form at the distal end of the hot wire which, in turn, would cause the deleterious elements in the hot wire to vaporize. Thus, the maximum rate at which the hot wire melts without vaporizing in this process is the rate limiting step which controls the maximum speed at which this process can be carried out.

In the inventive process of FIG. 3, however, this constraint is avoided by using primary welding electrode 314 to supply a substantial amount of the metals that will form weld deposit 322. For this purpose, the amount of heat energy supplied by non-consumable tungsten electrode 319 is increased relative to the amount that is supplied in the conventional TIG/hot wire welding process described above, this additional amount of heat being sufficient to melt the distal end 320 of primary welding wire 314 in addition to a portion of workpiece 312 being welded. The overall result is that the inventive process of FIG. 3 can be carried out faster than the conventional TIG/hot wire welding process, since more heat energy can be used to heat more metal for forming the weld pool in a given period of time. Nonetheless, because the deleterious elements needed to form the weld are supplied by the hot wire, vaporization of these deleterious elements into the weld fumes is still avoided.

Figure 4:
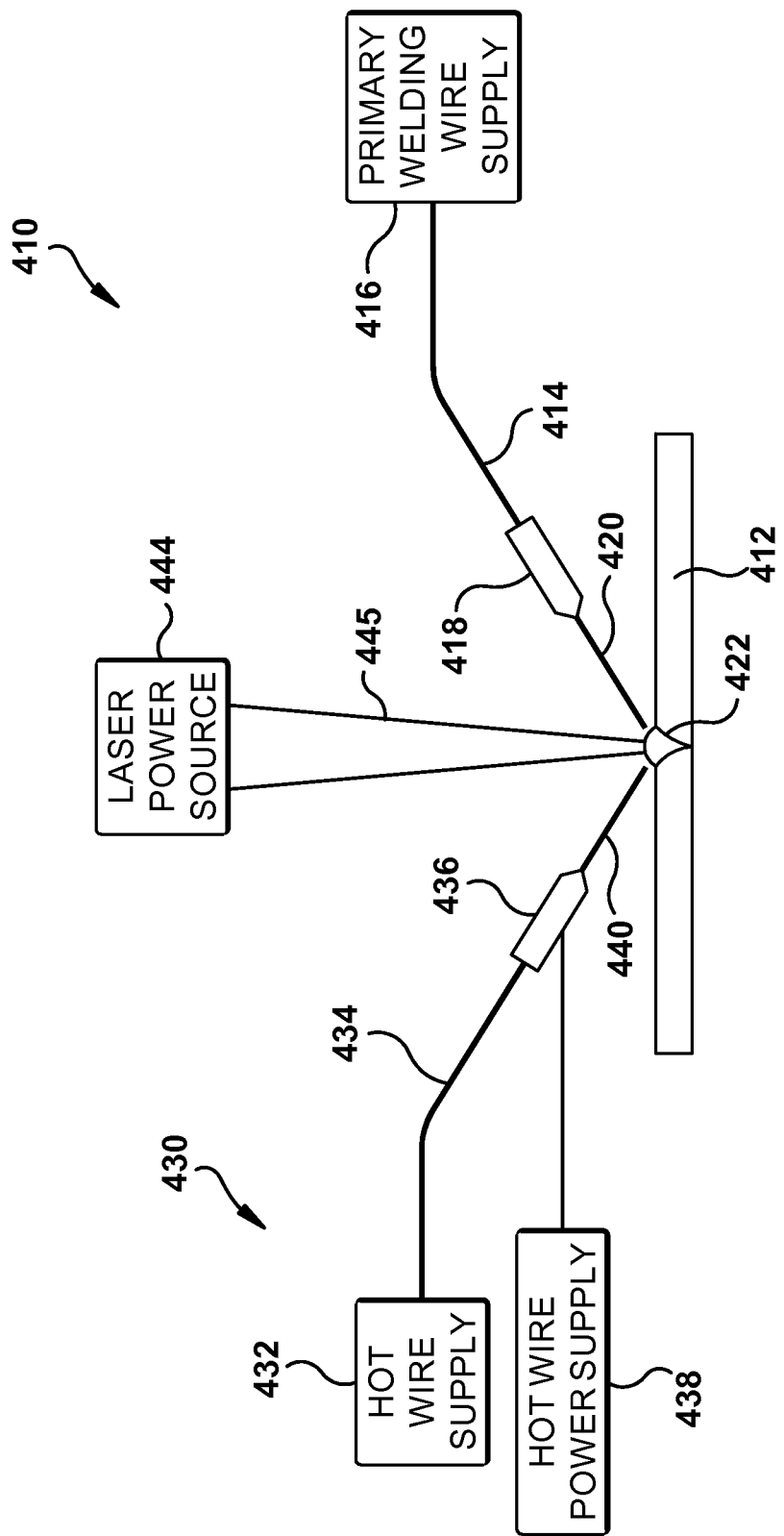
FIG. 4 is a schematic illustration similar to FIGS. 1-3 illustrating a modified laser-assisted welding process adopting a hot wire welding approach in accordance with this invention.

FIG. 4 illustrates another embodiment of this invention in which the non-oxyfuel welding process which adopts the hot wire welding approach of this invention is a laser-assisted welding process. As shown in this figure, a conventional laser-assisted welding assembly generally indicated at 410 is used to form a weld in a workpiece 412. For this purpose, primary welding wire 414 is advanced from primary welding wire supply 416 through torch 418 in such a way that its distal end 420 approaches weld pool 422. Laser 444 supplies enough laser energy via laser beam 445 to form weld pool 422 by melting distal end 420 of primary welding wire 414 as well as the portion of the workpiece being welded. If desired, an optional inert shielding gas can supplied through means not shown for protecting weld pool 422 as it solidifies.

In accordance with this invention, a hot wire assembly generally indicated at 430 is provided for separately supplying selected deleterious elements to weld pool 422, i.e., separate and apart from primary welding wire 414. This hot wire assembly has essentially the same structure and operates in essentially the same way as hot wire assemblies 230 and 330 shown above in connection with FIGS. 2 and 3. Thus, hot wire assembly 430 includes hot wire supply 432 for supplying hot wire 434 to hot wire torch 436 and a hot wire power supply 438 for supplying electrical power to hot wire torch 436. In a manner similar to hot wire assemblies 230 and 330 of FIGS. 2 and 3, hot wire torch 436 is also operated so that distal end 440 of hot wire 434 desirably just touches weld pool 422 at a location which is not directly bombarded by laser beam 445, while hot wire power supply 438 is operated so that the distal end 440 of this hot wire is raised only to at or near its melting temperature by resistance heating.

As a result, little if any of distal end 440 of hot wire 434 vaporizes into the atmosphere, since it has been essentially shielded from the high temperatures created by laser beam 445. The overall result is that only a very small portion, if any, of the ingredients forming hot wire 434 vaporize into the weld fumes generated by this welding process. As a result, like the inventive welding processes of FIGS. 2 and 3, this feature can be taken advantage here to minimize the amounts of deleterious elements that escape into the weld fumes created by this welding process, while simultaneously maintaining the concentration of these deleterious elements in the weld deposit ultimately produced, by preferentially segregating these deleterious elements into hot wire 434.

As in the case of the inventive process of FIG. 3, the inventive process of FIG. 4 differs from processes for combining hot wire welding with laser-assisted welding in that the inventive laser/hot wire process uses primary welding wire 414 whereas the conventional laser/hot wire process does not. As a result, as in the case of the inventive welding process of FIG. 3, the inventive welding process of FIG. 4 also be carried out faster than the conventional laser/hot wire welding process, while simultaneously minimizing vaporization of the deleterious elements in the weld deposit to be formed into the weld fumes.

Figure 5:
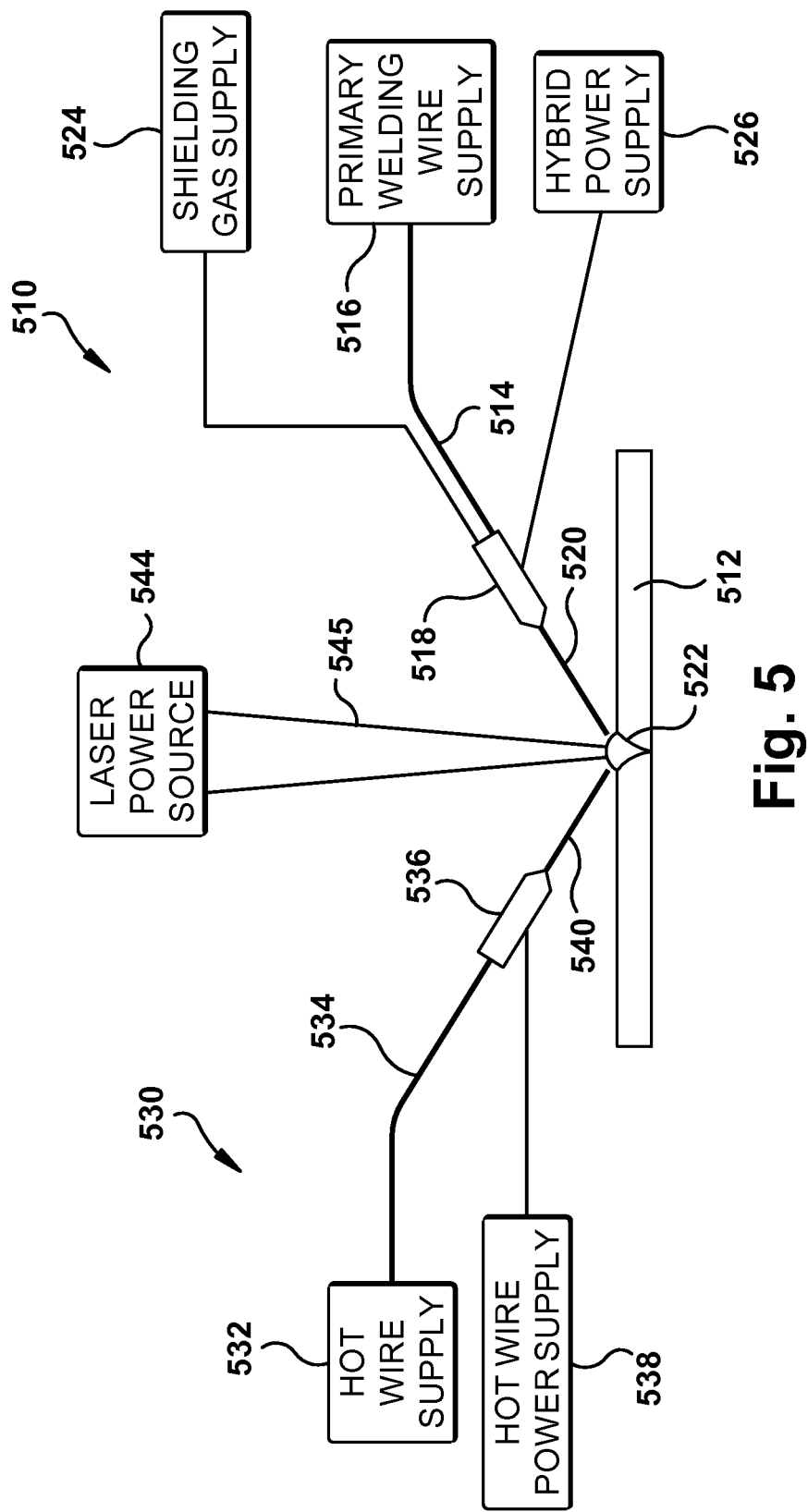
FIG. 5 is a schematic illustration similar to FIGS. 1-4 illustrating a modified hybrid laser-assisted welding process adopting a hot wire welding approach in accordance with this invention and FIG. 6 is a schematic illustration similar to FIGS. 1-5, in which the non-oxyfuel welding process which adopts the hot wire welding approach of this invention is a modified hybrid TIG welding process.

FIG. 5 illustrates still another embodiment of this invention in which the non-oxyfuel welding process which adopts the hot wire welding approach of this invention is a modified hybrid laser-assisted welding process. As shown in this figure, a conventional hybrid laser-assisted welding assembly generally indicated at 510 is used to form a weld in a workpiece 512. For this purpose, shielding gas supply 524, primary welding wire supply 516 and hybrid power supply 526 supply a shielding gas, primary welding wire 514 and electrical power, respectively, to welding torch 518. In addition, laser 544 supplies laser energy via laser beam 545 to the site of the weld being formed. As in the case of the conventional hybrid laser-assisted welding, enough electrical power is supplied by hybrid power supply 526 and laser 544 to form weld pool 522 by melting both the distal end of 520 of primary welding wire 514 as well as the portion of the workpiece being welded.

In accordance with this invention, a hot wire assembly generally indicated at 530 is provided for separately supplying selected deleterious elements to weld pool 522, i.e., separate and apart from primary welding wire 514. This hot wire assembly has essentially the same structure and operates in essentially the same way as hot wire assemblies 230, 330 and 430 shown above in connection with FIGS. 2, 3 and 4. Thus, hot wire assembly 530 includes hot wire supply 532 for supplying hot wire 534 to hot wire torch 536 and a hot wire power supply 538 for supplying electrical power to hot wire torch 536. As in the case of the hot wire assemblies of FIGS. 2, 3 and 4, hot wire torch 536 is also operated so that distal end 540 of hot wire 534 desirably just touches weld pool 522 at a location which is not directly bombarded by laser beam 545 and not directly exposed to the electrical arc created between the distal end 520 of primary welding wire 514 and workpiece 512, while hot wire power supply 538 is operated so that the temperature of distal end 540 of this hot wire is raised only to at or near its melting temperature by resistance heating.

As a result, little if any of distal end 540 of hot wire 534 vaporizes into the atmosphere, since it has been prevented from being exposed to the extremely high temperatures generated by laser beam 545 and the electric arc created between distal end 520 of primary welding wire 514 and weld pool 522. The overall result is that only a very small portion, if any, of the ingredients forming hot wire 534 vaporize into the weld fumes generated by this welding process. As a result, like the inventive welding processes of FIGS. 2, 3 and 4, this feature can be taken advantage here to minimize the amounts of deleterious elements that escape into the weld fumes created by this welding process, while simultaneously maintaining a desirably high concentration of these deleterious elements in the weld deposit ultimately made, by preferentially segregating these deleterious elements into hot wire 534.

Figure 6:
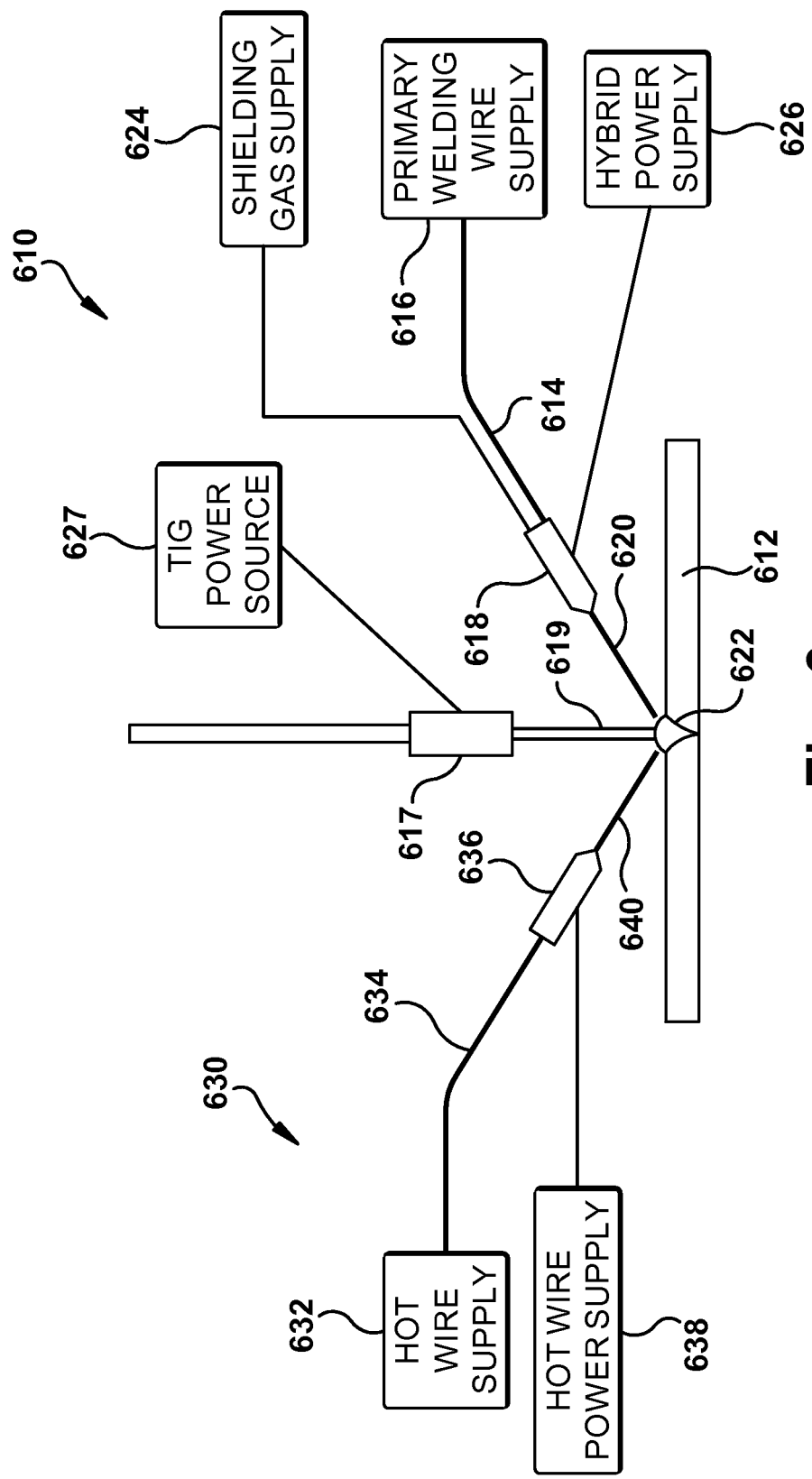

FIG. 6 illustrates still another embodiment of this invention in which the non-oxyfuel welding process which adopts the hot wire welding approach of this invention is a modified hybrid TIG welding process. As shown in this figure, a hybrid TIG welding assembly generally indicated at 610 is used to form a weld in a workpiece 612. For this purpose, shielding gas supply 624, primary welding wire supply 616 and hybrid power supply 626 supply a shielding gas, primary welding wire 614 and electrical power, respectively, to welding torch 618. In addition, TIG power supply 627 supplies electrical power to TIG welding torch 617 in such a way that a welding arc is created between non-consumable tungsten electrode 619 held in welding torch 618 and weld pool 622. Enough electrical power is supplied by hybrid power supply 626 and TIG power supply 627 to form weld pool 622 by melting both the distal end 620 of primary welding wire 614 as well as the portion of the workpiece being welded.

In accordance with this invention, a hot wire assembly generally indicated at 630 is provided for separately supplying selected deleterious elements to weld pool 622, i.e., separate and apart from primary welding wire 614. This hot wire assembly has essentially the same structure and operates in essentially the same way as hot wire assemblies shown in the previous embodiments of this invention. Thus, hot wire assembly 630 includes hot wire supply 632, hot wire torch 636 and hot wire power supply 638. As in the case of the hot wire assemblies of the previous embodiments of this invention, hot wire torch 636 is also operated so that distal end 640 of hot wire 634 desirably just touches weld pool 622 at a location which is not directly exposed to the electrical arcs created between workpiece 612, on the one hand, and the distal ends of primary welding wire 614 and tungsten electrode 619, on the other hand. In addition, hot wire power supply 638 is operated so that the temperature of distal end 640 of this hot wire is raised only to at or near its melting temperature by resistance heating.

As a result, the amount of deleterious elements that vaporize into the weld fumes created by this welding process is minimized even though the concentration of these deleterious elements in the weld deposit ultimately made is kept desirably high in the same way as accomplished in the other embodiments of this invention, as described above.

The foregoing figures provide only a few specific examples of how the inventive hot wire welding process can be accomplished. As well understood in the art, however, hot wire welding can be accomplished in many different ways in connection with a variety of different types of non-oxyfuel welding processes including arc welding, laser-assisted welding and electron beam welding. For example, hot wire welding can be used in connection gas metal arc welding (GMAW), flux core arc welding (FCAW), gas-shielded flux core arc welding (FCAW-G), self-shielded flux core arc welding (FCAW-S), submerged arc welding (SAW), laser-assisted welding and hybrid laser-assisted welding, just to name a few.

An important feature which characterizes all of these hot wire welding processes, regardless of the particular type of welding technique used, is that a substantial majority of the electrical energy needed to accomplish welding is supplied by a high intensity power source (or the combination of such high intensity power source and a hybrid power source in the case of a hybrid welding process such as the hybrid laser-assisted welding process shown in FIG. 5 or the hybrid TIG welding process shown in FIG. 6). In this disclosure, this high intensity power source is referred to as a "primary" power source or supply. In other patents and publications, this high intensity power source may be referred to as a "high intensity" power supply, a "high energy" power source or supply, a laser power source or supply, a GMAW power source or supply and/or a TIG power source or supply.

Another important feature which characterizes all of these hot wire welding processes is that at least one welding filler wire, the "hot wire," is supplied to the welding site by an approach in which heating of the distal end of this hot wire to the extremely high temperatures generated by the high intensity or "primary" power source of the welding process is avoided. This is not to say that the distal end of this hot wire is never exposed to the high temperatures generated by the high intensity power source. Rather, what this means is that approaches are taken to insure that the length of time the distal end of the hot wire is exposed to these high temperature, if this does occur, is kept to a desired minimized such that the ingredients forming the hot wire are not heated all the way up to these extremely high temperatures. Various approaches can be used for this purpose, as well known in the art, such approaches including controlling the electrical power used to resistance heat the hot wire, controlling the electrical power supplied to the primary power supply for generating the welding arc and/or laser beam, controlling the speed with which the distal end of the hot wire advances to the welding site, and controlling the location at which the distal end of the hot wire advances to the weld site with respect to the electric arc and/or laser beam, just to name a few.

In any event, it will be understood that in the context of this disclosure, indicating that heating of the hot wire is accomplished without exposing it to the extremely high temperatures generated by the high intensity (primary) power source does not mean that this exposure is avoided completely. Rather, it means that approaches are taken to insure that the length of time the distal end of the hot wire is exposed to these temperatures, if this does occur, is kept to a desired practical minimum.

Hot wire welding has been described in numerous patents and publications, examples of which include U.S. 2011/0297658, U.S. 2013/0043219, U.S. Pat. No. 8,653,417, U.S. 2014/0263193, U.S. 2014/0263234 and U.S. 2015/0014283. The disclosures of all of these patents and publications are incorporated herein by reference in their entireties, it being understood that the hot wire welding processes disclosed in each of these patents and publications can be used for carrying out the non-oxyfuel welding process of this invention.

Finally, still another important feature which characterizes the hot wire welding processes of this invention is that least two consumable welding electrodes are used. As indicated above, it is already known to combine hot wire welding with TIG welding as well as with laser-assisted welding. As further indicated above, one result of these combinations is that vaporization of any deleterious metals that may be brought to the weld pool is minimized in much the same way as in this invention. However, these hot wire processes use only a single welding electrode, the hot wire, and hence are inherently limited in terms of speed.

In accordance with this invention, at least two welding electrodes are used, one or more primary electrodes and at least one hot wire. With this approach, a substantial amount of the metal forming the weld pool can be supplied by the primary electrode which is formulated to contain little or no deleterious ingredients. Accordingly, these welding electrodes can be exposed to the extremely high temperatures generated by a welding arc and/or a laser beam without causing deleterious ingredients to vaporize in the weld pool. This enables a greater amount of heat energy to be imparted to the workpiece during the welding operation, which in turn enables the rate of weld formation to be increased substantially relative to processes in which only hot wires are used. The result is minimizing the amount of deleterious ingredients vaporized into the weld fumes, while simultaneously enabling a substantial increase in welding speed.

Incidentally, while the above description has illustrated the inventive hot wire welding processes being accomplished with only one hot welding wire, it will be appreciated that two, three or more hot wires can be used if desired.

Electrode Chemistry

As a preliminary matter, it should be appreciated that it is customary in the welding industry to refer to the chemistries of particular welding electrodes in terms of the chemistries of the undiluted weld deposits they make. That is to say, it is customary to refer to the chemistry of a particular welding electrode in terms of the chemical composition of the weld deposit that it produces when melted and solidified without contamination from any other source such as a workpiece being welded. This customary practice is also adopted in this disclosure.

Turning now to substance, the chemistry (i.e., the ingredients) of welding electrodes is a highly developed field in the sense that, for each particular alloy to be welded, the particular chemistries of particular welding electrodes that are appropriate for welding that particular alloy are well known.

For example, a conventional welding electrode marketed by the assignee of this disclosure under the designation "Techalloy 308/308 L" for welding different types of stainless steels forms an undiluted weld deposit containing significant amounts chromium, nickel and manganese, all three of which are necessary for welding certain stainless steels and all three of which are known to be deleterious to health. In accordance with this invention, a complementary pair of welding electrodes is provided which, when used together in the inventive process, produce an undiluted weld deposit having essentially the same chemical composition as that produced by this conventional electrode while simultaneously generating weld fumes containing minimal amounts of these deleterious elements.

This is illustrated in the following Table 1, which shows the undiluted weld deposit compositions produced by three different welding electrodes. The first of these welding electrodes is the conventional Techalloy 308/308 L welding electrode. The second is a primary welding electrode made in accordance with this invention, while and the third is a complementary hot wire welding electrode also made in accordance with this invention. Both of these inventive welding electrodes have been formulated so that, when used together in equal amounts, they produce the combined undiluted weld deposit composition shown in the last column of this table which, as can be seen, has essentially the same chemical composition as that produced by the conventional Techalloy 308/308 L welding electrode. In this context, "equal amounts" means that the rate at which a given mass (weight) of metal is laid down in the weld deposit from each electrode is the same.

TABLE 1

Weld Deposit Chemistries of Conventional and Corresponding Inventive Welding Electrodes

| Ingredient, wt % | Techalloy 308/308L (Conventional) | Inventive Electrodes | | |
|---|---|---|---|---|
| | | Primary | Hot Wire | Combined |
| C | 0.01 | 0.01 | 0.01 | 0.01 |
| Cr | 19.3 | 0 | 39 | 19.5 |
| Ni | 9.3 | 0 | 19 | 9.5 |
| Mo | 0.1 | 0 | 0.4 | 0.2 |
| Mn | 1.7 | 0.05 | 3.4 | 1.7 |
| Si | 0.4 | 0.1 | 0.7 | 0.4 |
| Fe | balance | balance | balance | balance |

From this table, it can be seen that all of the deleterious chromium, nickel and manganese of the undiluted weld deposit produced by the conventional Techalloy 308/308 L electrode are provided in the hot wire electrode of this invention, while none of these deleterious elements is provided in the primary electrode of this invention. Nonetheless, the chemical composition of the combined undiluted weld deposit produced when these electrodes are used together in equal amounts is essentially identical to the chemical composition of the undiluted weld deposit made by this conventional electrode when used alone. This means that this complementary pair of inventive electrodes can be used to produce weld deposits having essentially the same chemical composition as the conventional Techalloy 308/308 L electrode, while at the same time producing welding fumes containing essentially no chromium, nickel or manganese because vaporization of these deleterious elements during welding has been avoided essentially completely.

In the particular embodiment illustrated in Table 1, all of the deleterious chromium, nickel and manganese were eliminated from the primary welding wire, with the entire amount of these deleterious elements being supplied to the weld pool by the complementary hot wire welding electrode of this invention. In other embodiments, less than all of these deleterious elements can be removed from the primary electrode. For example, in one embodiment of this invention, a primary welding electrode especially suitable for use in welding stainless steels by the inventive process can contain up to 5 wt. % chromium, up to 5 wt. % nickel and up to 1 wt. % manganese. In other embodiments, such primary welding electrodes can be formulated to contain lesser amounts of these elements, for example, no more than 3 wt. %, 2 wt. % or even 1 wt. % chromium, no more than 3 wt. %, 2 wt. % or even 1 wt. % nickel, and not more than 0.8 wt. %, 0.7 wt. % or even 0.6 wt. % molybdenum.

In still other embodiments, the primary and hot wire electrodes of this invention can be formulated to produce a desired combined undiluted weld deposit when different amounts of these complementary welding electrodes are used, i.e., when the rate at which a given mass (weight) of metal is supplied to the weld pool by each electrode used in the inventive process (hereinafter the "mass supply rate" of the electrode) is different from one another.

For example, if it were desired to modify the inventive process shown above in connection with Table 1 by feeding the primary electrode to the weld pool at a mass supply rate approximately 50% greater than that mass supply rate of the hot wire electrode, then the amount of deleterious elements in the specific hot wire used would need to be increased accordingly. In particular, the concentrations of Cr, Ni, Mo, Mn and Si in the specific hot wire welding electrode used would need to be 25% greater than the concentrations of these same ingredients in the hot wire of Table 1 in order keep the rate at which each ingredient is supplied to the weld pool the same. Thus, a hot wire containing 0.01 wt. % C, ~49 wt. % Cr, ~24 wt. % Ni, ~0.5 wt. % Mo, ~4.3 wt. % Mo and ~0.9 wt. % Si would be used, assuming the same primary electrode of Table 1 were also used.

It some embodiments of this invention, it might be desirable to feed the primary electrode to the weld pool at a mass supply rate which is so much greater than that of the hot wire electrode that all of the deleterious ingredients cannot be supplied by a single hot wire. For example, it would not be possible to feed the primary electrode of Table 1 to the weld pool at a supply rate which is 2.5 times that of a single hot wire and still produce the same combined undiluted weld deposit as in Table 1, because the amounts of ingredients that would be needed to be included in this single hot wire would exceed 100%.

So in this instance, at least some of these deleterious elements would need to be supplied by the primary electrode, if using only a single hot wire were desired, which is disadvantageous due to possible contamination of the weld fumes with these deleterious elements. A better approach in accordance with yet another embodiment of this invention would be to use two or more hot wires at the same time which, together, provide all the needed deleterious elements. For example, if two hot wires of the composition of Table 1 were used at the same time, then both could be fed to the weld pool at half the mass supply rate of the primary welding electrode of Table 1 to produce the same combined undiluted weld deposit of this table.

It will therefore be appreciated that using multiple hot wires provides the further benefit of allowing the mass supply rates at which the different welding electrodes are supplied to be varied for accommodating different operating regimens of the hot wire welding process.

In any event, in accordance with all embodiments of this invention, the amount of deleterious elements found in the weld fumes generated by a non-oxyfuel welding process can be reduced, without suffering a corresponding decrease in the concentration of these deleterious elements in the weld deposit ultimately produced, by segregating these deleterious elements into the hot wire welding electrode or electrodes used in the inventive process.

The extent to which these deleterious elements should be segregated into hot wire or wires used in the inventive process can vary widely and essentially any degree of segregation can be used. So, for example, the primary electrode used in the inventive process (or primary electrodes if multiple primary electrodes are used) can be formulated to contain no more than 45 wt. %, no more than 40 wt. %, 45 wt. %, no more than 30 wt. %, 25 wt. %, no more than 20 wt. %, 15 wt. %, no more than 10 wt. %, no more than 5 wt. %, no more than 2 wt. %, and even no more than 1 wt. %, of the total amount of each deleterious element that will be supplied to a particular weld deposit from all welding electrodes. Correspondingly, the hot wire (or hot wires if multiple hot wires are used) can be formulated to contain at least 55 wt. %, at least 60 wt. %, at least 65 wt. %, at least 70 wt. %, at least 75 wt. %, at least 80 wt. %, at least 85 wt. %, at least 90 wt. %, at least 95 wt. %, at least 98 wt. %, or even as much as at least 99 wt. % of the total amount of each deleterious element that will be supplied to a particular weld deposit by all welding wires.

However, because the magnitude of the benefit obtained by this invention in terms of eliminating deleterious elements from the weld fumes is directly proportional the degree to which these deleterious elements are segregated into the hot wire or wires and away from the primary electrode or electrodes, it makes sense to retain as little of these deleterious elements in the primary welding electrode or electrodes of this invention as practicable.

In this regard, it is well understood in the welding industry that completely eliminating a particular element from the materials used to form welding electrodes can get very expensive and may even be impossible as a practical matter. Accordingly, in carrying out the inventive process, the extent to which deleterious elements are eliminated from the primary electrode or electrodes should not be so great that the overall process becomes uneconomic. Rather, the maximum extent by which these deleterious elements should be eliminated will normally be based on a cost/benefit analysis which compares the incremental benefit to be obtained by reducing the concentration of deleterious elements in the primary electrodes even further to the cost of making this further reduction.

So, for example, in the complementary pair of inventive electrodes exemplified in the above Table 1, the amounts of manganese and silicon in the primary electrode were not reduced to zero, or approximately zero, since the potential benefit to be obtained would not justify the cost of doing so. In effect, what this means is that the minimum amount of a particular deleterious element that is, or should be, included in the primary electrode used to practice a particular embodiment of this invention in order to achieve its maximum benefit is based primarily on economics, with this minimum amount being not be so high that the inventive process becomes uneconomic. Those skilled in the welding arts should have no difficulty developing these economics.

In other words, those skilled in the welding art would readily understand that, insofar as minimizing deleterious elements in the weld fumes is concerned, the more the amounts of these deleterious elements can be reduced in the primary welding electrode, the better. However, the cost of reducing all of the traditional alloying elements (Mn and Si) out of the welding electrodes would add significant cost. Furthermore, even if all deleterious elements were removed from all welding electrodes, some of these elements would likely still be present in the welding fumes due to the fact that the base metal (the piece to be welded) would likely contain these same elements (of which some will be vaporized from the welding arc). So, the extra cost of removing these deleterious elements completely from the welding electrode would not be justified.

To this end, the primary electrode deposit chemistry of the example of this invention of the above Table 1 represents a reasonably low level of manganese and silicon, but not so low as to add significant cost to the primary welding electrode.

Although only a few embodiments of this invention have been described above, it should be appreciated that many modifications can be made without departing from the spirit and scope of this invention. All such modifications are intended to be included within the scope of this invention, which is to be limited only by the following claims:

The invention claimed is:

1. An arc welding process for replicating a manganese-containing weld deposit produced when a single conventional welding electrode is used to produce said weld deposit as well as weld fumes, the single conventional welding electrode containing enough manganese so that the weld deposit produced contains a predetermined amount of manganese while the weld fumes generated contain an undesirably high amount of manganese, the arc welding process comprising carrying out the process by means of a hot wire welding approach in which (a) some of the ingredients forming the weld deposit are supplied by a primary welding electrode which is subjected to the intense heat generated by an electric arc while other of the ingredients forming the weld deposit are supplied by at least one hot wire welding electrode different from the primary welding electrode and (b) the at least one hot wire electrode is melted without being subjected to the intense heat generated by the electric arc, the process further comprising reducing the amount of manganese in the weld fumes without reducing the amount of manganese in the weld deposit by supplying greater than 50% of the manganese in the weld deposit by means of the at least one hot wire welding electrode, wherein the primary electrode still contains up to 1 wt. % manganese so that refining all manganese out of the metal forming the primary electrode is avoided, and further wherein the at least one hot wire electrode is resistance heated so that the arc welding process can be carried out at a rate which is faster than would otherwise be the case if the at least one hot wire welding electrode were not resistance heated.

2. The process of claim 1, wherein greater than 75% of the manganese in the weld deposit is supplied by the at least one hot wire welding electrode.

3. The process of claim 2, wherein greater than 95% of the manganese in the weld deposit is supplied by the at least one hot wire welding electrode.

4. The process of claim 1, wherein the primary welding electrode and the at least one hot wire welding electrode form a weld pool which solidifies to form the weld deposit, and further wherein the primary welding electrode and the at least one hot wire welding electrode are fed to the weld pool at the same mass supply rate.

5. The process of claim 1, wherein the primary welding electrode and the at least one hot wire welding electrode form a weld pool which solidifies to form the weld deposit, and further wherein the mass supply rate at which the primary welding electrode is fed to the weld pool is greater than the mass supply rate at which the at least one hot wire welding electrode is fed to the weld pool.

6. The process of claim 1, wherein the process further comprises feeding the at least one hot wire welding electrode to the weld pool at a lower mass supply rate than the mass supply rate at which the primary welding electrode is fed to the weld pool.

7. The process of claim 1, wherein the at least one hot wire welding electrode comprises a single hot wire welding electrode.

8. The process of 61, wherein the arc welding process is a gas metal arc welding (GMAW) process.

9. The process of claim 1, wherein the arc welding process is a tungsten inert gas (TIG) welding process.

10. The process of claim 1, wherein the weld deposit also contains one or more deleterious elements selected from chromium, nickel, cadmium and lead, and further wherein at least some of amount of this one or more deleterious elements is included in the at least one hot wire welding electrode.

* * * * *